(No Model.)

D. A. GUNN.
Velocipede.

No. 233,671.                Patented Oct. 26, 1880.

Attest:
N. Barthel
Charles J. Hunt

Inventor:
D. A. Gunn
By Atty
Thos. S. Sprague

UNITED STATES PATENT OFFICE.

DANIEL A. GUNN, OF WESTON, OHIO.

VELOCIPEDE.

SPECIFICATION forming part of Letters Patent No. 233,671, dated October 26, 1880.

Application filed March 27, 1880. (No model.)

*To all whom it may concern:*

Be it known that I, DANIEL A. GUNN, of Weston, in the county of Wood and State of Ohio, have invented an Improvement in Velocipedes, of which the following is a specification.

The nature of this invention relates to certain new and useful improvements in the construction and application of devices particularly designed for propelling four-wheeled vehicles; and the invention consists in the peculiar construction and arrangement of an operating-lever and seat, whereby a nearly-continuous rotation is imparted to a ratchet-wheel, from which a like motion is imparted to the rear wheels of the vehicle; in the peculiar construction of a steering apparatus, and in the peculiar construction, arrangement, and combinations of the various parts.

I am aware that various patents have been granted upon velocipedes which have been driven by means of crank or foot levers operating upon the axle, and by rocking seats which have been directly connected to the crank-shaft; but I am not aware that a velocipede has heretofore been constructed wherein the operator sits upon a saddle and operates the driving mechanism by means of a vertically-pivoted lever, the reciprocating motion of which imparts a nearly-continuous rotary motion to the driving-wheels by means of the connections and in the manner hereinafter described.

Figure 1:
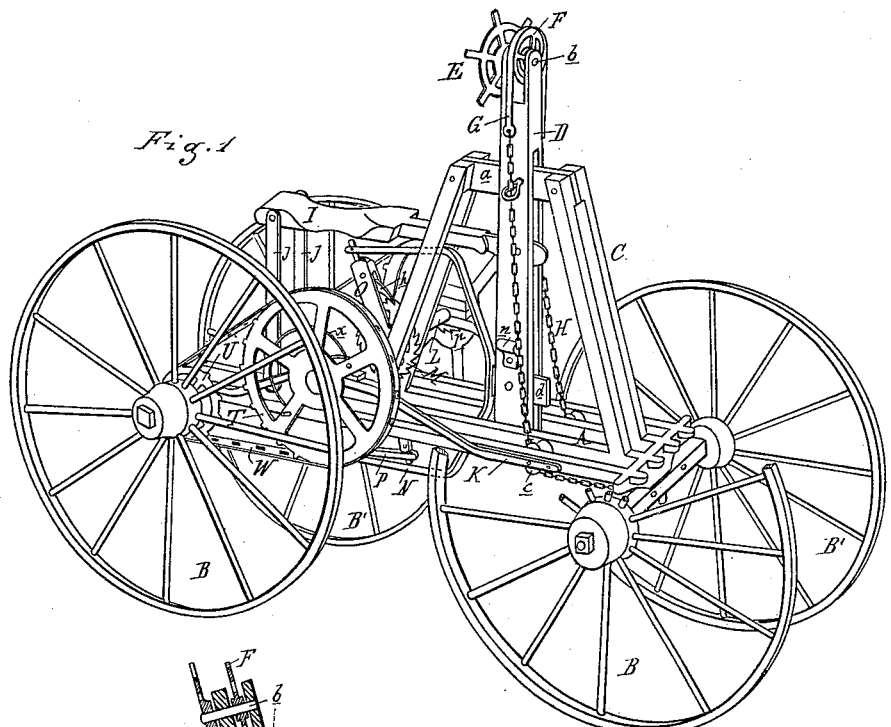
Figure 2:
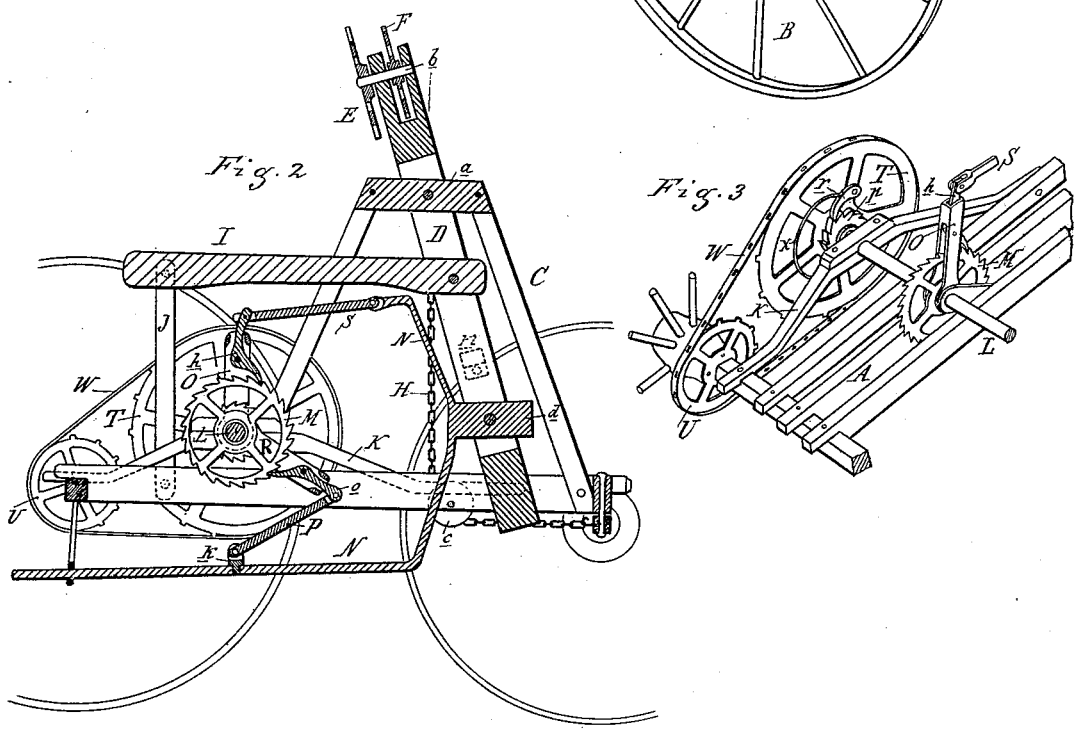
Figure 3:
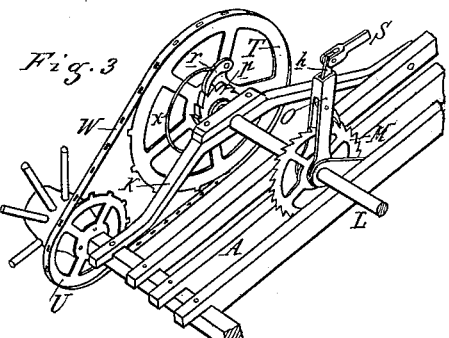

In the drawings, Figure 1 is a perspective view. Fig. 2 is a vertical central longitudinal section. Fig. 3 is a perspective of one of the drive-wheels and its connections detached.

In the accompanying drawings, which form a part of this specification, A represents a suitable frame or body mounted upon the wheels B B'. Upon this frame is erected a frame, C, to the upper cross-bar, $a$, of which is pivotally secured the lever D. In the top of this lever D is properly journaled a shaft, $b$, to which are secured a hand-wheel, E, and a toothed wheel, F, the latter of which engages with a belt or flat-link chain, G, the ends of which are attached to the chains H, which lead down under the pulleys $c$ in the side of the frame A, and thence forward, and are attached to the front axle. By these connections the front wheels may be turned to give the desired direction to the vehicle.

A saddle or seat, I, has its front end pivotally secured in the lever D, while its rear end is likewise pivotally supported between the standards J, the lower ends of which are pivoted to the frame A.

K represents side brace-rods extending from the front of the frame to the rear axle.

A shaft, L, is journaled laterally across the frame A in proper boxes on top of the side braces, and has rigidly secured to its longitudinal center a ratchet-wheel, M.

A metal frame, N, having an arm, $d$, is pivoted between or in the lever D, and to its upper end is pivoted a rod, S, to the opposite end of which is pivoted a pawl, $h$, fulcrumed in the arm O, sleeved upon the shaft L. The lower arm of this frame N extends rearward through a hanger pendent from the rear axle, and which acts as a guide for the frame in its reciprocating motion.

Studs or ears $k$, secured to the upper side of the lower arm of the frame N, have pivotally secured to them one end of the rod P, the opposite end of which is pivoted to the outer end of a pawl, $o$, fulcrumed in a forked arm, R, sleeved upon the shaft L. Upon the outer end of the shaft L are journaled the spur-wheels T, and upon the inner faces of the hubs of the hind wheels are rigidly secured smaller toothed wheels U. Around these wheels I place an endless flat-link chain, W, with which the spurs on both the wheels T U engage.

Upon the shaft L is secured a ratchet-wheel, $p$, close to the inner faces of the wheels T, and with which engage pawls $r$, pivoted to the wheels T, said pawls being kept in contact with the ratchet-wheels by means of the spring-click $x$.

In practice the operator sits astride the saddle or seat I, placing the feet in the stirrups $n$ and grasping the hand-wheel E with his hands. By then alternately pushing with his feet and hands a reciprocating motion is imparted to the lever D and seat I, and through the connections herein described a rotary motion is imparted to the wheels B, which drive the vehicle ahead, while its direction is governed by turning the hand-wheel to the right or left.

What I claim as my invention is—

1. In a velocipede, the combination of the ratchet M, said ratchet being secured to a counter-shaft, L, from which motion is communicated to the driving-wheels B by means of belts or chains W, passing around the wheel T, the latter connected with the shaft L by any suitable mechanism so as to revolve with it, and a smaller wheel, U, upon the inner faces of the hubs of the wheels B, with the pawls h o, the rods S P, and frame or yoke N, and the lever D, pivotally supported in the upper cross-bar, a, of the frame C, substantially as set forth.

2. In a velocipede, and in combination with the lever D, supported, as described, upon the frame C, the seat I, pivotally supported upon the standards J and to the lever D, and adapted to have a reciprocating motion, substantially as specified.

3. In a velocipede, the combination of the lever D, the hand-wheel E, spur-wheel F, pulleys c, journaled in the frame A, and chains G H, the latter attached directly to the front axle, substantially as and for the purposes set forth.

DANIEL A. GUNN.

Witnesses:
G. M. UTZ,
J. M. CHRISTMANN.